US010931358B2

(12) United States Patent
Chen (10) Patent No.: US 10,931,358 B2
(45) Date of Patent: Feb. 23, 2021

(54) DATA TRANSMISSION METHOD, TERMINAL DEVICE AND NETWORK DEVICE (71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/621,676

(22) PCT Filed: Jul. 26, 2017

(86) PCT No.: PCT/CN2017/094507
§ 371 (c)(1),
(2) Date: Dec. 11, 2019

(87) PCT Pub. No.: WO2019/019055
PCT Pub. Date: Jan. 31, 2019

(65) Prior Publication Data
US 2020/0195331 A1 Jun. 18, 2020

(51) Int. Cl.
*H04B 7/06* (2006.01)
*H04B 7/0456* (2017.01)
(Continued)

(52) U.S. Cl.
CPC ......... *H04B 7/0689* (2013.01); *H04B 7/0456* (2013.01); *H04W 72/02* (2013.01); *H04W 72/042* (2013.01)

(58) Field of Classification Search
CPC ... H04B 7/0689; H04B 7/0456; H04W 72/02; H04W 72/042; H04W 4/00
See application file for complete search history.

(56) References Cited

U.S. PATENT DOCUMENTS 7,899,953 B2    3/2011  Inoue
2013/0315337 A1* 11/2013 Dai ...................... H04L 5/0057
                                                           375/267

(Continued)

FOREIGN PATENT DOCUMENTS

CN    102098770 A    6/2011
CN    102404029 A    4/2012

(Continued)

OTHER PUBLICATIONS

Extended EP Search Report for EP 17919365.1 dated Mar. 9, 2020.
English translation of CN OA for CN 201780091768.6 dated May 6, 2020.

*Primary Examiner* — Dac V Ha (57) ABSTRACT

A method for transmitting information, a terminal device, and a network device are provided, the method includes: transmitting, by a terminal device, first data to a network device at least once; receiving, by the terminal device, first indication information transmitted by the network device, wherein the first indication information is used for indicating one transmission in at least one transmission of the first data; determining, by the terminal device, a transmission parameter of second data according to the first indication information; and transmitting, by the terminal device, the second data to the network device by adopting the transmission parameter of the second data.

18 Claims, 4 Drawing Sheets (51) Int. Cl.
*H04W 72/02* (2009.01)
*H04W 72/04* (2009.01)

(56) References Cited

U.S. PATENT DOCUMENTS

| | | | | |
|---|---|---|---|---|
| 2015/0249490 A1* | 9/2015 | Chen | ............... | H04W 72/02 |
| | | | | 375/295 |
| 2016/0374098 A1* | 12/2016 | Jongren | ............... | H04L 1/0026 |
| 2018/0146460 A1* | 5/2018 | Lee | ............... | H04W 72/0446 |
| 2020/0163059 A1* | 5/2020 | Zhang | ............... | H04L 5/10 |

FOREIGN PATENT DOCUMENTS

| | | |
|---|---|---|
| CN | 103716081 A | 4/2014 |
| CN | 104640211 A | 5/2015 |
| CN | 105430590 A | 3/2016 |
| CN | 106411475 A | 2/2017 |
| CN | 106888507 A | 6/2017 |
| EP | 2587704 A2 | 5/2013 |
| EP | 3307002 A1 | 4/2018 |
| WO | 2016114696 A1 | 7/2016 |
| WO | 2016206650 A1 | 12/2016 |

* cited by examiner

S210 — A terminal device transmits first data to a network device at least once.

S220 — The terminal device receives first indication information transmitted by the network device, and the first indication information is used for indicating one transmission in the at least one transmission of the first data.

S230 — The terminal device determines a transmission parameter of second data according to the first indication information.

S240 — The terminal device transmits the second data to the network device by adopting the transmission parameter of the second data.

DATA TRANSMISSION METHOD, TERMINAL DEVICE AND NETWORK DEVICE

CROSS-REFERENCE TO RELATED APPLICATION(S)

This application is a 371 application of International Application No. PCT/CN2017/094507, filed on Jul. 26, 2017, the entire disclosure of which is hereby incorporated by reference.

TECHNICAL FIELD

The present disclosure relates to a field of communication, and more particularly to a method for transmitting data, a terminal device and a network device.

BACKGROUND

In 5G system, a grant-free (also called scheduling-free)-based uplink data transmission mode is introduced, a terminal device can initiate an uplink data transmission autonomously without scheduling signaling from a network device. However, because the terminal device does not know a situation of a current uplink channel, the terminal device may not be able to adopt the best transmission mode, thus it is difficult to achieve a larger transmission gain, resulting in lower transmission reliability.

Therefore, a method for transmitting data, which can improve the reliability of an uplink transmission, is needed.

SUMMARY

Implementations of the present disclosure provide a method for transmitting data, a terminal device, and a network device, which can improve reliability of an uplink transmission.

In a first aspect, a method for transmitting data is provided, including:

transmitting, by a terminal device, first data to a network device at least once;

receiving, by the terminal device, first indication information transmitted by the network device, wherein the first indication information is used for indicating one transmission in the at least one transmission of the first data;

determining, by the terminal device, a transmissions parameter of second data according to the first indication information; and transmitting, by the terminal device, the second data to the network device by adopting the transmission parameter of the second data.

In combination with the first aspect, in some implementation modes of the first aspect, the first data is data transmitted autonomously by the terminal device.

In combination with the first aspect, in some implementation modes of the first aspect, transmitting, by the terminal device, the first data to the network device at least once, includes: transmitting, by the terminal device, the first data to the network device multiple times by adopting different transmission modes.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different MIMO transmission modes.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different antenna ports.

For example, the terminal device may adopt a first antenna port for the first transmission of the first data and a second antenna port for the second transmission of the first data, wherein the first antenna port is different from the second antenna port.

It should be noted that in an implementation of the present disclosure, the first antenna port may include at least one antenna port, and the second antenna port may also include at least one antenna port. The difference between the first antenna port and the second antenna port may refer to that the at least one antenna port included in the first antenna port is partially different or completely different from the at least one antenna port included in the second antenna port.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different precoding matrices.

For example, the terminal device may acquire a precoding matrix used for each transmission of the first data from the preconfigured precoding matrix set by polling. As an example but not a limitation, the terminal device may pre-store a precoding matrix set containing N precoding matrices, and for the kth transmission of the first data, the terminal device may pre-encode the first data by adopting a precoding matrix with an index of m in the precoding matrix set, wherein N is an integer greater than 1, k is an integer greater than or equal to 1, and $m=(k-1) \bmod N$.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different antenna array blocks.

Optionally, the terminal device may acquire an antenna array block used for each transmission of the first data from multiple antenna array blocks by polling. For example, if the terminal device includes N antenna array blocks, for the kth transmission of the first data, the terminal device may transmit by the antenna array block with an index of p, wherein N is an integer greater than 1, k is an integer greater than or equal to 1, and $p=(k-1) \bmod N$.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different beams.

Optionally, the terminal device may determine a beam used for each transmission of the first data from multiple beams by polling. For example, a terminal device determines N beams in advance, wherein N is an integer greater than 1, the N beams may be used for the terminal device to transmit data to a network device, and the terminal device may transmit the first data to the network device by adopting the beams in the N beams alternately. As an example but not a limitation, for the kth transmission of the first data, the first data may be transmitted by adopting a beam with an index of q in the N beams, where q=(k−1)mod N.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different transmission powers.

For example, when the terminal device transmits the first data for the first time, it may adopt a lower transmission power to save power, and when the terminal device transmits the first data for the second time, the terminal device may adopt a relatively higher transmission power to improve the probability of successful transmission, that is, a higher transmission power may be adopted for the (k+1)th transmission than that for the kth transmission until the highest transmission power is reached.

In combination with the first aspect, in some implementation modes of the first aspect, transmitting, by the terminal device, the first data to the network device multiple times by adopting different transmission modes, includes: transmitting, by the terminal device, the first data to the network device multiple times by adopting different demodulation reference signal (DMRS) sequences.

In combination with the first aspect, in some implementation modes of the first aspect, the different transmission modes include a first transmission mode, and transmitting, by the terminal device, the first data to the network device multiple times by adopting different transmission modes, includes: determining, by the terminal device, a first resource pool corresponding to the first transmission mode according to the first transmission mode and a first corresponding relationship, wherein the first corresponding relationship is a corresponding relationship between multiple transmission modes and multiple resource pools, and a resource pools corresponding to each transmission mode is different; transmitting the first data to the network device in the first resource pool by adopting the first transmission mode.

Optionally, in an implementation of the present disclosure, the corresponding relationship may be a corresponding relationship between multiple MIMO transmission modes and multiple resource pools, a corresponding relationship between multiple antenna ports and multiple resource pools, or a corresponding relation between multiple transmission powers and multiple resource pools, etc.

Optionally, the corresponding relationship between multiple transmission modes used by the terminal device for transmitting the first data and multiple resource pools may be preconfigured for the terminal device by the network device. When the network device detects the first data in the resource pool, the transmission mode used by the terminal device for transmitting the data may be determined according to the resource pool and the corresponding relationship, thereby receiving the first data according to the determined transmission mode.

In combination with the first aspect, in some implementation modes of the first aspect, the transmission modes adopted by the terminal device for transmitting multiple times are preconfigured by the network device for the terminal device, or predetermined by the terminal device and the network device, or determined by the terminal device.

In combination with the first aspect, in some implementation modes of the first aspect, receiving, by the terminal device, the first indication information transmitted by the network device, includes: receiving, by the terminal device, downlink control information (DCI) transmitted by the network device for scheduling the second data, wherein the DCI includes the first indication information.

In combination with the first aspect, in some implementation modes of the first aspect, determining, by the terminal device, transmission parameter of the second data according to the first indication information, includes: determining, by the terminal device, a transmission parameter used for the one transmission indicated by the first indication information as the transmission parameter of the second data.

In combination with the first aspect, in some implementation modes of the first aspect, the transmission parameter includes at least one of the following: a time domain resource, a frequency domain resource, a code domain resource, a DMRS sequence, a MIMO transmission mode, an antenna port, a precoding matrix, an antenna array block, a beam, and a transmission power.

In combination with the first aspect, in some implementation modes of the first aspect, the first indication information is specifically used for indicating an index of the one transmission in the at least one transmission, or a resource or a resource index used for the one transmission.

In a second aspect, a method for transmitting data is provided, including:

receiving, by a network device, first data transmitted by a terminal device at least once;

transmitting, by the network device, first indication information to the terminal device, wherein the first indication information is used for indicating one transmission in the at least one transmission of the first data, and the first indication information is used for the terminal device to determine a transmission parameter of second data; and receiving, by the network device, the second data transmitted by the terminal device by adopting the transmission parameter of the second data.

In combination with the second aspect, in some implementation modes of the second aspect, the transmission parameter includes at least one of the following: a time domain resource, a frequency domain resource, a code domain resource, a DMRS sequence, a MIMO transmission mode, an antenna port, a precoding matrix, an antenna array block, a beam, and a transmission power.

In combination with the second aspect, in some implementation modes of the second aspect, the first indication information is specifically used for indicating an index of the one transmission in the at least one transmission, or a resource or resource index used for the one transmission.

In combination with the second aspect, in some implementation modes of the second aspect, the first indication information is specifically used for indicating one transmission with a best transmission quality in the at least one transmission determined by the network device.

In a third aspect, a terminal device is provided, used for performing the method in the above first aspect or any possible implementation mode of the first aspect. Specifically, the terminal device includes units for performing the method of the above first aspect or any possible implementation mode of the above first aspect.

In a fourth aspect, a network device is provided, used for performing the method in the above second aspect or any possible implementation mode of the second aspect. Specifically, the network device includes units used for performing the method of the above second aspect or any possible implementation mode of the above second aspect.

In a fifth aspect, a terminal device is provided. The terminal device includes a memory, a processor, an input interface, and an output interface. The memory, the processor, the input interface and the output interface are connected through a bus system. The memory is used for storing instructions, and the processor is used for executing the instructions stored in the memory to perform the method of the above first aspect or any possible implementation mode of the above first aspect.

In a sixth aspect, a network device is provided. The network device includes a memory, a processor, an input interface, and an output interface. The memory, the processor, the input interface and the output interface are connected through a bus system. The memory is used for storing instructions, and the processor is used for executing the instructions stored in the memory to perform the method of the above second aspect or any possible implementation mode of the above second aspect.

In a seventh aspect, a computer storage medium is provided for storing computer software instructions for performing the method of the above first aspect or any possible implementation mode of the above first aspect or the method of the above second aspect or any possible implementation mode of the above second aspect, and the computer software instructions include programs designed for executing the above aspects.

In an eighth aspect, a computer program product containing instructions is provided, when the computer program product is running on a computer, the computer is caused to perform the method of the above first aspect or any optional implementation mode of the above first aspect, or the method of the above second aspect or any optional implementation mode of the above second aspect.

DETAILED DESCRIPTION

In the following, a technical solution in implementations of the present disclosure will be described in combination with drawings of the implementations of the present disclosure.

The technical solution of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, or a future 5G system.

Figure 1:
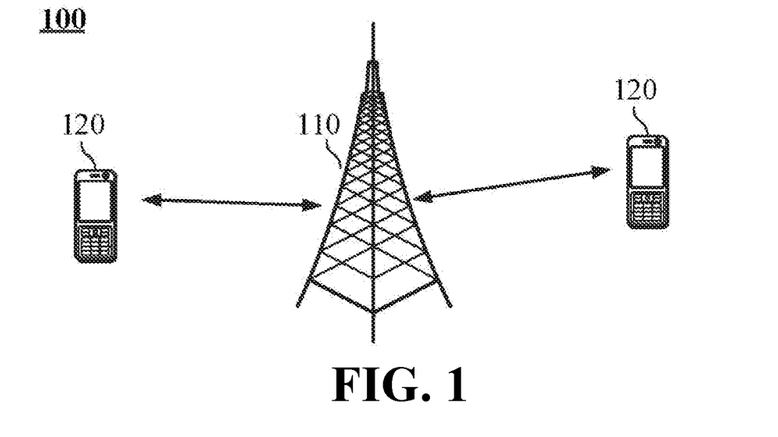
FIG. 1 is a schematic diagram of a communication system according to an implementation of the present disclosure.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Alternatively the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, a terminal direct connection (Device to Device, D2D) communication may be performed between the terminal devices 120.

Optionally, the 5G system or network may also be referred to as a New Radio (NR) system or network.

FIG. 1 exemplifies one network device and two terminal devices. Optionally, the wireless communication system 100 may include multiple network devices, and another quantity of terminal devices may be included within the coverage area of each network device, and this is not restricted in implementations of the present disclosure.

In the wireless communication system 100, a terminal device may transmit data to another terminal device or network device by adopting a grant-free-based uplink data transmission mode or an autonomous uplink transmission mode. By adopting the grant-free-based uplink transmission mode, the terminal device may transmit the data autonomously to another terminal device or network device without receiving scheduling instructions from other devices.

Optionally, the wireless communication system 100 may further include other network entities such as a network controller, a mobile management entity, and this is not restricted in implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
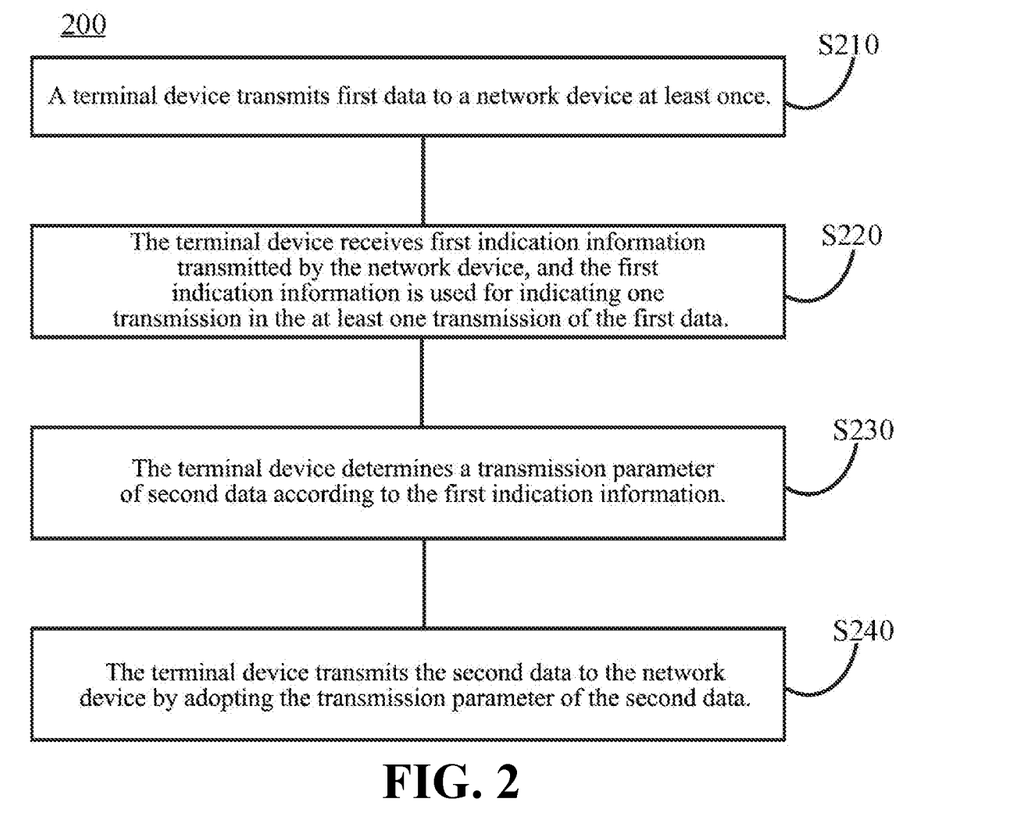
FIG. 2 is a schematic flowchart of a method for transmitting data according to an implementation of the present disclosure.

FIG. 2 is a schematic flow chart of a method 200 for transmitting data according to an implementation of the present disclosure, as shown in FIG. 2, the method 200 includes acts S210-S240.

In S210, a terminal device transmits first data to a network device at least once.

The terminal device may be a terminal device in the wireless communication system shown in FIG. 1, and the network device may be a network device in the wireless communication system shown in FIG. 1.

Specifically, the terminal device may transmit the first data to the network device once, or may also transmit the first data to the network device multiple times, the first data is data autonomously transmitted by the terminal device, or the first data is data transmitted by the terminal device in a grant-free-based uplink transmission mode.

Optionally, the first data autonomously transmitted by the terminal device may be transmitted without receiving a scheduling instruction from the network device, or may be transmitted without receiving acknowledgement/negative acknowledgement (ACK/NACK) information from the network device. For example, the first data may be an uplink grant-free transmission performed by the terminal device without uplink grant of the network device. In this case, the terminal device may autonomously perform one or more transmissions of the first data without detecting Downlink Control Information (DCI) transmitted by the network device through the downlink control channel.

If at least one transmission of the first data includes multiple transmissions, further, the S210 may include: the terminal device transmits the first data to the network device multiple times by adopting different transmission modes.

That is, the terminal device may use different transmission modes to transmit the first data multiple times, or a transmission mode corresponding to each transmission is different.

It should be understood that in an implementation of the present disclosure, data packets transmitted in the multiple transmissions may or may not be the same, but they all contain at least the first data. For example, data packets transmitted by the terminal device during the first transmission may include the first data and the third data, and data packets transmitted during the second transmission may include the first data and the fourth data.

Because different MIMO transmission modes have different influences on transmission performance, the terminal device uses different transmission modes to transmit the first data to the network device multiple times, the network device may determine one transmission with the best transmission quality among the multiple transmissions according to reception situations of the multiple transmissions. Further, the network device may transmit the first indication information to the terminal device to inform the terminal device of the one transmission with the best transmission quality. Therefore, the terminal device may determine a transmission parameter used for a subsequent data transmission according to a transmission parameter used for the one transmission with the best transmission quality, thereby improving the reliability of the uplink transmission.

Optionally, as one implementation, the terminal device transmits the first data to the network device multiple times by adopting different transmission modes, including:

the terminal device transmits the first data to the network device multiple times by adopting different MIMO transmission modes.

The multiple-input multiple-output (MIMO) transmission mode specifically refers to the MIMO technology used for transmitting signals. For example, the MIMO transmission mode may include transmit diversity, codebook-based precoding, non-codebook-based precoding, single antenna port transmission, beamforming, and other transmission modes.

Specifically, the terminal device may transmit the first data multiple times and may use different MIMO transmission modes. For example, the multiple transmissions include two transmissions, and the terminal device may respectively adopt two of the above MIMO transmission modes for the two transmissions of the first data. As an example but not a limitation, the terminal device may use a MIMO transmission mode of non-codebook based precoding for the first transmission of the first data and a MIMO transmission mode of transmit diversity for the second transmission of the first data.

Since adopting different MIMO transmission modes, the influence on the transmission performance of the first data is different. For example, a higher precoding gain may be obtained by adopting the MIMO transmission mode of non-codebook based precoding, but the channel reciprocity may be non-ideal, which may lead to a transmission failure. However, more stable transmission performance may be obtained by adopting a MIMO transmission mode of transmit diversity or single antenna port. Therefore, the terminal device transmits the first data by adopting different MIMO transmission modes, so that the network device may determine a MIMO transmission mode with the best transmission quality from multiple MIMO transmission modes, and further, the terminal device may be informed of which MIMO transmission mode has the best transmission quality, so that the terminal device may use this MIMO transmission mode for a subsequent data transmission, thereby improving the reliability of the uplink transmission.

Optionally, as another implementation, the terminal device transmits the first data to the network device multiple times by adopting different transmission modes, including: the terminal device transmits the first data to the network device multiple times by adopting different antenna ports.

Specifically, the terminal device may transmit the first data multiple times by adopting different antenna ports. For example, multiple transmissions include two transmissions, the terminal device may use a first antenna port for the first transmission of the first data and a second antenna port for the second transmission of the first data, the first antenna port is different from the second antenna port.

It should be noted that in an implementation of the present disclosure, the first antenna port may include at least one antenna port, and the second antenna port may also include at least one antenna port. The difference between the first antenna port and the second antenna port may refer to that the at least one antenna port included in the first antenna port is partially different or completely different from the at least one antenna port included in the second antenna port.

For example, if the terminal device includes N antenna ports, for the kth transmission of the first data, the terminal device may perform transmission through the antenna port with an index of n, where N is an integer greater than 1, k is an integer greater than or equal to 1, and $n=(k-1) \bmod N$, i.e., n is an integer obtained by $\bmod (k-1)$. Wherein, different antenna ports may use different beams for shaping, or different precoding matrices for precoding, or different antenna ports may be mapped to different physical antennas.

Optionally, as yet another implementation, the terminal device transmits the first data to the network device multiple times by adopting different transmission modes, including: the terminal device transmits the first data to the network device multiple times by adopting different precoding matrices.

That is, the terminal device may transmit the first data multiple times by adopting different precoding matrices. In a possible implementation mode, the terminal device may acquire the precoding matrix used for each transmission of the first data from the preconfigured precoding matrix set by polling. For example, the terminal device may pre-store a pre-coding matrix set containing N pre-coding matrices, and for the kth transmission of the first data, the terminal device may pre-code the first data by adopting the pre-coding matrix with an index of m in the pre-coding matrix set, wherein N is an integer greater than 1, k is an integer greater than or equal to 1, and $m=(k-1) \bmod n$.

Optionally, as yet another implementation, the terminal device transmits the first data to the network device multiple times by adopting different transmission modes, including: the terminal device transmit the first data to the network device multiple times by adopting different antenna array blocks.

In other words, the terminal device may transmit the first data multiple times by adopting different antenna array blocks. In a possible implementation, the terminal device may obtain the antenna array block used for each transmission of the first data from multiple antenna array blocks by polling. For example, if the terminal device includes N antenna array blocks, for the kth transmission of the first data, the terminal device may perform transmission through the antenna array block with an index of p, where N is an integer greater than 1, k is an integer greater than or equal to 1, and $p=(k-1) \bmod n$.

Herein, an antenna array block is also called a Panel, and one Panel consists of a group of antenna arrays. Different antenna array blocks are connected with independent radio frequency modules and may transmit signals independently.

Optionally, as yet another implementation, the terminal device transmits the first data to the network device multiple times by adopting different transmission modes, including: the terminal device transmits the first data to the network device multiple times by adopting different beams.

That is, the terminal device may adopt different beams for transmitting the first data multiple times. For example, the terminal device may adopt a first beam to transmit the first data for the first time and a second beam different from the first beam to transmit the first data for the second time.

It should be understood that in an implementation of the present disclosure, the first beam may include at least one beam and the second beam may also include at least one beam, and the difference between the first beam and the second beam may refer to that the at least one beam included in the first beam is partially different or completely different from the at least one beam included in the second beam.

In a possible implementation, the terminal device may determine a beam used for each transmission of the first data from multiple beams by polling. For example, the terminal device determines N beams in advance, wherein N is an integer greater than 1, the N beams may be used for the terminal device to transmit data to a network device, and the terminal device may transmit the first data to the network device by adopting the beams in the N beams alternately. As anf example but not a limitation, for the kth transmission of the first data, the first data may be transmitted by adopting a beam with an index of q in the N beams, where $q=(k-1) \bmod N$. Wherein, the N beams may be indicated to a terminal device by a network device, that is, the network device may configure the N beams for the terminal device, for example, the network device may configure the N beams for the terminal device through semi-static signaling (e.g., Radio Resource Control (RRC) signaling) or dynamic signaling (e.g., DCI).

Optionally, as yet another implementation, the terminal device transmits the first data to the network device multiple times by adopting different transmission modes, including: the terminal device transmits the first data to the network device multiple times by adopting different transmission powers.

Specifically, the terminal device may adopt different transmission powers for transmitting the first data multiple times. For example, when the terminal device transmits the first data for the first time, it may adopt a lower transmission power to save power, and when the first data is transmitted for the second time, the terminal device may adopt a relatively higher transmission power to improve the probability of successful transmission, that is, a higher transmission power may be adopted for the (k+1)th transmission than that for the kth transmission until the highest transmission power is reached.

Optionally, in an implementation of the present disclosure, an incremental value of the transmission power (which may be referred to as a power increment value or power stepping value) for the (k+1)th transmission relative to that for the kth transmission of the first data of the terminal device may be preconfigured by the network device for the terminal device, or the terminal device may use a fixed power increment value or power stepping value.

Optionally, as yet another implementation, the terminal device transmits the first data to the network device multiple times by adopting different transmission modes, including: the terminal device transmits the first data to the network device multiple times by adopting different demodulation reference signal (DMRS) sequences.

A DeModulation Reference Signal (DMRS) sequence is used for correlation demodulation of an uplink control channel and a data channel, therefore, different DMRS sequences may affect uplink demodulation performance.

Optionally, in some implementations, the different transmission modes include a first transmission mode, and the terminal device transmits the first data to the network device multiple times by adopting different transmission modes, including: the terminal device determines a first resource pool corresponding to the first transmission mode according to the first transmission mode and a first corresponding relationship, wherein the first corresponding relationship is a corresponding relationship between multiple transmission modes and multiple resource pools, and a resource pool corresponding to each transmission mode is different. In the first resource pool, the first data is transmitted to the network device by adopting the first transmission mode.

That is, the terminal device transmits the first data multiple times and may transmit the first data in different resource pools. Optionally, multiple transmission modes used by the terminal device for transmitting the first data may have corresponding relationships with multiple resource pools, and the terminal device may determine a resource pool used for transmitting the first data according to the transmission mode used for transmitting the first data and the corresponding relationship, so that when the first data is transmitted by using the transmission mode, the terminal device may perform the transmission in the resource pool. For example, the terminal device may determine a first resource pool corresponding to the first transmission mode according to the first transmission mode and the corresponding relationship between multiple transmission modes and multiple resource pools when transmitting the first data by adopting the first transmission mode, so that the first data may be transmitted in the first resource pool when transmitting the first data by adopting the first transmission mode.

Optionally, in an implementation of the present disclosure, the corresponding relationship may be a corresponding relationship between multiple MIMO transmission modes and multiple resource pools, a corresponding relationship between multiple antenna ports and multiple resource pools, or a corresponding relationship between multiple transmission powers and multiple resource pools, etc.

Optionally, the corresponding relationship between the multiple transmission modes used by the terminal device for transmitting the first data and the multiple resource pools may be preconfigured for the terminal device by the network device. When the network device detects the first data in the resource pool, the transmission mode used by the terminal device for transmitting the data may be determined according to the resource pool and the corresponding relationship, thereby the first data is received according to the determined transmission mode.

According to the above implementations, the terminal device may use different MIMO transmission modes, or different antenna ports, or different precoding matrices, or different antenna array blocks, or different beams, or different transmission powers, or different DMRS sequences for transmitting the first data multiple times. That is, at least one of a MIMO transmission mode, an antenna port, a precoding matrix, an antenna array block, a beam, a transmission power, and a DMRS sequence used for transmitting the first data multiple times is different.

Optionally, in an implementation of the present disclosure, the transmission mode adopted by the terminal device for the multiple transmissions may be preconfigured by the network device for the terminal device, or may be preagreed by the terminal device and the network device, or may be determined autonomously by the terminal device.

In S220, the terminal device receives first indication information transmitted by the network device, the first indication information is used for indicating one transmission in the at least one transmission of the first data.

Specifically, the network device may determine one transmission with the best transmission quality in the at least one transmission according to the reception situation of the at least one transmission of the first data, and the first indication information may be used for indicating the transmission with the best transmission quality in the at least one transmission, so that the terminal device may determine a transmission parameter for a subsequent data transmission according to the first indication information.

For example, the first indication information may indicate an index of one transmission in the at least one transmission, or may indicate a resource or resource index adopted in the one transmission, or the first indication information may indicate an index of a time slot in which the one transmission is located. It should be noted that a resource here may be a time domain resource, a frequency domain resource, a code resource, etc.

Optionally, the S220 may specifically include: the terminal device receives downlink control information (DCI) transmitted by the network device for scheduling the second data, and the DCI includes the first indication information.

For example, if the maximum number of transmissions of the first data is 8, a 3-bit indication field is used to carry the first indication information in the DCI. As an example but not a limitation, it may be set to indicate the first transmission of the first data when the 3-bit indication field is 000, and to indicate the second transmission of the first data when the 3-bit indication field is 001, and so on.

In S230, the terminal device determines a transmission parameter of second data according to the first indication information.

Specifically, the terminal may determine a transmission parameter used for one transmission indicated by the first indication information as the transmission parameter of the second data, or may adjust a transmission parameter used for one transmission indicated by the first indication information, and determine the adjusted transmission parameter as the transmission parameter of the second data, and so on.

Optionally, in an implementation of the present disclosure, the transmission parameter includes at least one of the following: a time domain resource, a frequency domain resource, a code domain resource, a DMRS sequence, a MIMO transmission mode, an antenna port, a precoding matrix, an antenna array block, a beam, and a transmission power.

Further, in S240, the terminal device transmits the second data to the network device by adopting the transmission parameter of the second data.

Therefore, in the method for transmitting data according to an implementation of the present disclosure, the terminal device may transmit the first data to the network device at least once, so that the network device determines one transmission with the best transmission quality in the at least one transmission according to the reception situation of the at least one transmission, and then the network device may transmit the first indication information to the terminal device for indicating the one transmission determined by the network device. Therefore, the terminal device may determine a transmission parameter of the second data according to the first indication information, and further use the transmission parameter of the second data to transmit the second data, thereby improving the reliability of an uplink transmission.

The method for transmitting data according to an implementation of the present disclosure is described in detail from the perspective of a terminal device above in combination with FIG. 2. A method for transmitting data according to an implementation of the present disclosure is described in detail from the perspective of a network device below in combination with FIG. 3. It should be understood that the description of the network device side corresponds to the description of the terminal device side, and similar descriptions may refer to the above text, which will not be repeated here to avoid repetition.

Figure 3:
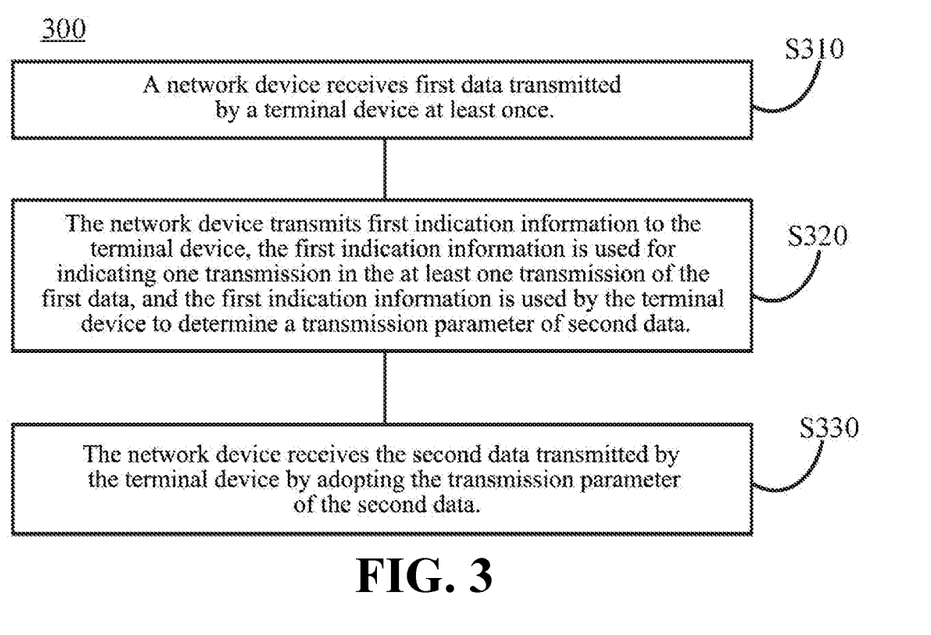
FIG. 3 is a schematic block diagram of a device for transmitting data according to an implementation of the present disclosure.

FIG. 3 is a schematic flow chart of a method for transmitting data according to another implementation of the present disclosure. As shown in FIG. 3, the method 300 includes acts S310-S330.

In S310, a network device receives first data transmitted by a terminal device at least once.

In S320, the network device transmits first indication information to the terminal device, the first indication information is used for indicating one transmission in the at least one transmission of the first data, and the first indication information is used by the terminal device to determine a transmission parameter of second data.

In S330, the network device receives the second data transmitted by the terminal device by adopting the transmission parameter of the second data.

Optionally, in some implementations, the transmission parameter includes at least one of the following: a time domain resource, a frequency domain resource, a code domain resource, a DMRS sequence, a MIMO transmission mode, an antenna port, a precoding matrix, an antenna array block, a beam, and a transmission power.

Optionally, in some implementations, the first indication information is specifically used for indicating an index of the one transmission in the at least one transmission, or a resource or resource index used for the one transmission.

Optionally, in some implementations, the first indication information is specifically used for indicating the one transmission with the best transmission quality in the at least one transmission determined by the network device.

Therefore, in the method for transmitting data according to an implementation of the present disclosure, the network device may receive the first data transmitted by the terminal device at least once, determine the one transmission with the best transmission quality in the at least one transmission according to the reception situation of the at least one transmission, and then transmit the first indication information to the terminal device for indicating the one transmission determined by the network device, so that the terminal device may, according to the first indication information, determine a transmission parameter of the second data, and then adopt the transmission parameter of the second data to transmit the second data to the network device, thereby improving the reliability of an uplink transmission.

Method implementations of the present disclosure are described in detail above in combination with FIGS. 2 to 3. Device implementations of the present disclosure are described in detail below in combination with FIGS. 4 to 7. It should be understood that the device implementations and the method implementations correspond to each other, and description of the method implementations may be referred to for similar description of the device implementations.

Figure 4:
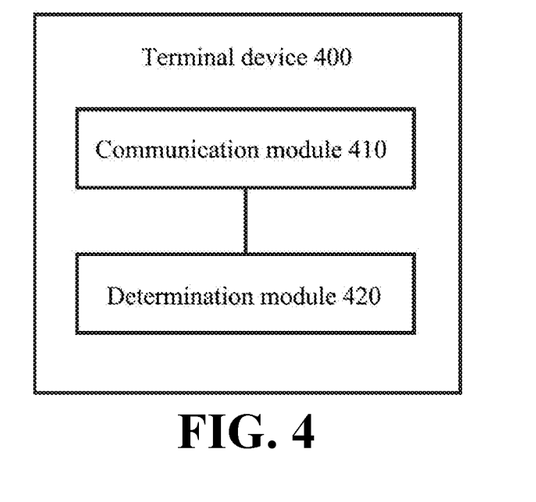
FIG. 4 is a schematic block diagram of a terminal device according to an implementation of the present disclosure.

FIG. 4 shows a block diagram of a terminal device 400 according to an implementation of the present disclosure. As shown in FIG. 4, the terminal device 400 includes a communication module 410 and a determination module 420.

The communication module 410 is used for transmitting first data to a network device at least once and receiving first indication information transmitted by the network device, wherein the first indication information is used for indicating one transmission in the at least one transmission of the first data.

The determination module 420 is used for determining a transmission parameter of second data according to the first indication information.

The communication module 410 is further used for transmitting the second data to the network device by adopting the transmission parameter of the second data.

Optionally, in some implementations, the first data is data transmitted by the terminal device autonomously.

Optionally, in some implementations, the communication module 410 is further used for: transmitting the first data to the network device multiple times by adopting different transmission modes.

Optionally, in some implementations, the determination module 410 is specifically used for: transmitting the first data to the network device multiple times by adopting different multiple input multiple output (MIMO) transmission modes.

Optionally, in some implementations, the communication module 410 is further used for: transmitting the first data to the network device multiple times by adopting different antenna ports.

Optionally, in some implementations, the communication module 410 is further used for: transmitting the first data to the network device multiple times by adopting different precoding matrices.

Optionally, in some implementations, the communication module 410 is further used for: transmitting the first data to the network device multiple times by adopting different antenna array blocks.

Optionally, in some implementations, the communication module 410 is further used for: transmitting the first data to the network device multiple times by adopting different beams.

Optionally, in some implementations, the communication module 410 is further used for: transmitting the first data to the network device multiple times by adopting different transmission powers.

Optionally, in some implementations, the communication module 410 is further used for: transmitting the first data to the network device multiple times by adopting different demodulation reference signal (DMRS) sequences.

Optionally, in some implementations, the different transmission modes include a first transmission mode, and the determination module 420 is further used for: determining a first resource pool corresponding to the first transmission mode according to the first transmission mode and a first corresponding relationship, wherein the first corresponding relationship is a corresponding relationship between multiple transmission modes and multiple resource pools, and a resource pool corresponding to each transmission mode is different.

The communication module 410 is further used for transmitting the first data to the network device by adopting the first transmission mode in the first resource pool.

Optionally, in some implementations, the transmission modes adopted by the terminal device for transmitting multiple times are preconfigured for the terminal device by the network device, or predetermined by the terminal device and the network device, or determined by the terminal device.

Optionally, in some implementations, the determination module 410 is specifically used for: receiving downlink control information (DCI) transmitted by the network device for scheduling the second data, wherein the DCI includes the first indication information.

Optionally, in some implementations, the determination module 420 is specifically used for: determining a transmission parameter used for the one transmission indicated by the first indication information as the transmission parameter of the second data.

Optionally, in some implementations, the transmission parameters include at least one of the following: a time domain resource, a frequency domain resource, a code domain resource, a DMRS sequence, a MIMO transmission mode, an antenna port, a precoding matrix, an antenna array block, a beam, and a transmission power.

Optionally, in some implementations, the first indication information is specifically used for indicating an index of the one transmission in the at least one transmission, or a resource or resource index used for the one transmission.

It should be understood that the terminal device 400 according to an implementation of the present disclosure may correspond to the terminal device in the method 300 of the present disclosure, and the above-mentioned and other operations and/or functions of various units in the terminal device 400 are respectively for realizing the corresponding processes of the terminal device in the method 200 shown in FIG. 2, and this will not be repeated here for sake of conciseness.

Figure 5:
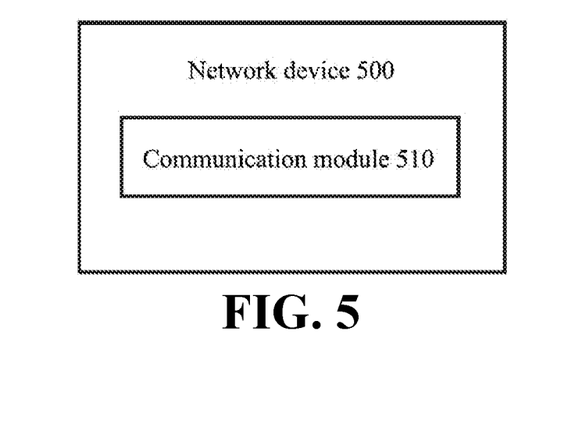
FIG. 5 is a schematic block diagram of a network device according to an implementation of the present disclosure.

FIG. 5 shows a block diagram of a network device 500 according to an implementation of the present disclosure. As shown in FIG. 5, the terminal device 500 includes a communication module 510.

The communication module 510 is used for receiving first data transmitted at least once by a terminal device, transmitting first indication information to the terminal device, and receiving the second data transmitted by the terminal device by adopting a transmission parameter of the second data, wherein the first indication information is used for indicating one transmission in the at least one transmission of the first data, and the first indication information is used by the terminal device to determine the transmission parameter of the second data.

Optionally, in some implementations, the transmission parameter includes at least one of the following: a time domain resource, a frequency domain resource, a code domain resource, a DMRS sequence, a MIMO transmission mode, an antenna port, a precoding matrix, an antenna array block, a beam, and a transmission power.

Optionally, in some implementations, the first indication information is specifically used for indicating an index of the one transmission in the at least one transmission, or a resource or resource index used for the one transmission.

Optionally, in some implementations, the first indication information is specifically used for indicating one transmission with the best transmission quality in the at least one transmission determined by the network device.

It should be understood that the device 500 for transmitting data according to an implementation of the present disclosure may correspond to the terminal device in the method implementations of the present disclosure, and the above-mentioned and other operations and/or functions of various units in the device 500 are respectively for realizing the corresponding processes of the terminal device in the method 300 shown in FIG. 3, and this will not be repeated here for sake of conciseness.

Figure 6:
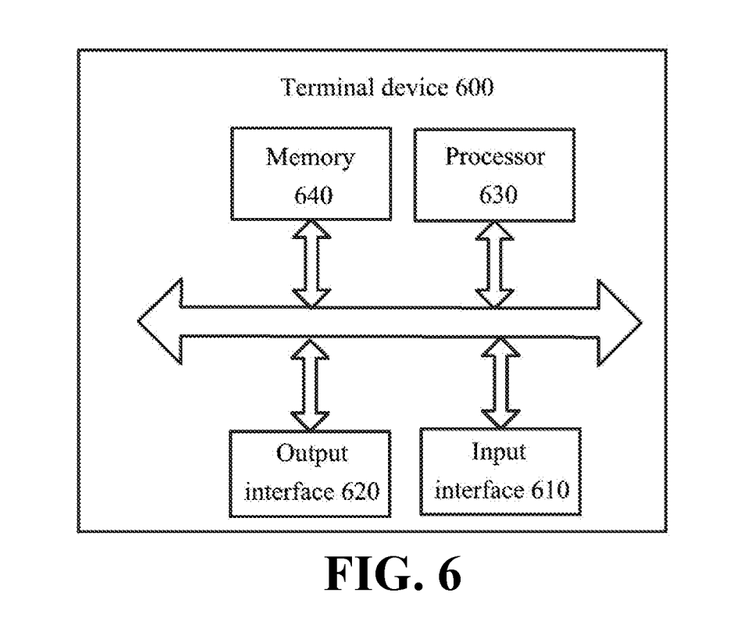
FIG. 6 is a block diagram of a terminal device according to another implementation of the present disclosure.

As shown in FIG. 6, an implementation of the present disclosure also provides a terminal device 600, which may be the terminal device 400 in FIG. 4 and may be used for performing the operations of the terminal device corresponding to the method 200 in FIG. 2. The terminal device 600 includes an input interface 610, an output interface 620, a processor 630, and a memory 640. The input interface 610, the output interface 620, the processor 630, and the memory 640 may be connected through a bus system. The memory 640 is used for storing programs, instructions, or codes. The processor 630 is used for executing programs, instructions, or codes in the memory 640 to control the input interface 610 to receive signals, to control the output interface 620 to transmit signals, and to accomplish the operations in the foregoing method implementations.

It should be understood that, in an implementation of the present disclosure, the processor 630 may be a central processing unit (CPU), or the processor 630 may be other general purpose processor, digital signal processor (DSP), application specific integrated circuit (ASIC), field programmable gate array (FPGA), or other programmable logic device, discrete gate or transistor logic device, or discrete hardware component, etc. The general purpose processor may be a microprocessor or the processor may be any conventional processor or the like.

The memory 640 may include a read-only memory and a random access memory, and provide instructions and data to the processor 630. A portion of the memory 640 may include non-volatile random access memory. For example, the memory 640 may also store type information of a device.

In an implementation process, various acts of the methods described above may be accomplished by integrated logic circuits of hardware or instructions in the form of software in the processor 630. The acts of the method disclosed in connection with the implementations of the present disclosure may be directly embodied as being accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 640, and the processor 630 reads the information in the memory 640, and accomplishes the contents of the above method in combination with its hardware. In order to avoid repetition, it will not be described in detail here.

In a specific implementation, the communication module 410 in FIG. 4 may be implemented by the input interface 610 and the output interface 620 of FIG. 6, and the determination module 420 in FIG. 4 may be implemented by the processor 630 of FIG. 6.

Figure 7:
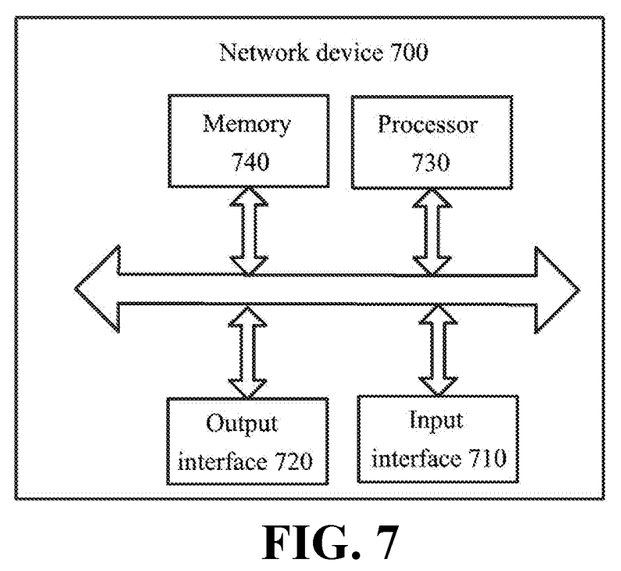
FIG. 7 is a schematic block diagram of a network device according to another implementation of the present disclosure.

As shown in FIG. 7, an implementation of the present disclosure also provides a network device 700, the network device 700 may be the network device 500 in FIG. 5, and may be used for performing the operations of the network device corresponding to the method 300 in FIG. 3. The network device 700 includes an input interface 710, an output interface 720, a processor 730, and a memory 740. The input interface 710, the output interface 720, the processor 730, and the memory 740 may be connected through a bus system. The memory 740 is used for storing programs, instructions, or codes. The processor 730 is used for executing programs, instructions, or codes in the memory 740 to control the input interface 710 to receive signals, to control the output interface 720 to transmit signals, and to complete the operations in the foregoing method implementations.

It should be understood that, in an implementation of the present disclosure, the processor 730 may be a central processing unit (CPU), or the processor 730 may be other general purpose processor, digital signal processor (DSP), application specific integrated circuit (ASIC), field programmable gate array (FPGA), or other programmable logic device, discrete gate or transistor logic device, or discrete hardware component, etc. The general purpose processor may be a microprocessor or the processor may be any conventional processor or the like.

The memory 740 may include a read-only memory and a random access memory, and provide instructions and data to the processor 730. A portion of memory 740 may include non-volatile random access memory. For example, the memory 740 may also store type information of a device.

In an implementation process, various acts of the methods described above may be accomplished by integrated logic circuits of hardware or instructions in the form of software in the processor 730. The acts of the method disclosed in connection with the implementations of the present disclosure may be directly embodied as being accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 740, and the processor 730 reads the information in the memory 740, and accomplishes the contents of the above method in combination with its hardware. In order to avoid repetition, it will not be described in detail here.

In a specific implementation, the communication module 510 in FIG. 5 may be implemented with the input interface 710 and the output interface 720 in FIG. 7.

Those of ordinary skill in the art will recognize that the exemplary units and algorithm acts described in connection with the implementations disclosed here may be implemented in electronic hardware, or a combination of computer software and electronic hardware. Whether these functions are implemented in hardware or software depends on a specific application and design constraint of the technical solution. Skilled in the art may use different approaches to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described here again.

In several implementations provided by the present disclosure, it should be understood that the disclosed system, device and method may be implemented in other ways. For example, the apparatus implementations described above are only illustrative. For example, the division of the units is only a logical function division, and there may be other division manners in actual realization. For example, multiple units or components may be combined or integrated into another system, or some features may be ignored or not executed. On the other hand, a mutual coupling or direct coupling or communication connection shown or discussed may be an indirect coupling or communication connection of devices or units through some interfaces and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions used for causing a computer device (which may be a personal computer, a server, or a network device, etc.) to perform all or part of the acts of the methods described in various implementations of the present disclosure. The aforementioned storage media include various media capable of storing program codes such as a U disk, a mobile hard disk, a read-only memory (ROM), a random access memory (RAM), a magnetic disk, or an optical disk.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A method for transmitting data, comprising:
   transmitting, by a terminal device, first data to a network device at least once;
   receiving, by the terminal device, first indication information transmitted by the network device, wherein the first indication information is used for indicating one transmission in at least one transmission of the first data;
   determining, by the terminal device, a transmission parameter of second data according to the first indication information; and
   transmitting, by the terminal device, the second data to the network device by adopting the transmission parameter of the second data; wherein transmitting, by the terminal device, the first data to the network device at least once, comprises:
   transmitting, by the terminal device, the first data to the network device a plurality of times by adopting different transmission modes.

2. The method of claim 1, wherein the first data is data transmitted by the terminal device autonomously.

3. The method of claim 1, wherein transmitting, by the terminal device, the first data to the network device a plurality of times by adopting the different transmission modes, comprises:
   transmitting, by the terminal device, the first data to the network device a plurality of times by adopting different Multiple-input Multiple-output (MIMO) transmission modes;
   or,
   transmitting, by the terminal device, the first data to the network device a plurality of times by adopting different antenna ports;
   or,
   transmitting, by the terminal device, the first data to the network device a plurality of times by adopting different precoding matrices;
   or,
   transmitting, by the terminal device, the first data to the network device a plurality of times by adopting different antenna array blocks;
   or,
   transmitting, by the terminal device, the first data to the network device a plurality of times by adopting different beams;
   or,
   transmitting, by the terminal device, the first data to the network device a plurality of times by adopting different transmission powers;
   or,
   transmitting, by the terminal device, the first data to the network device a plurality of times by adopting different demodulation reference signal (DMRS) sequences.

4. The method of claim 1, wherein the different transmission modes comprise a first transmission mode, and transmitting, by the terminal device, the first data to the network device a plurality of times by adopting the different transmission modes, comprises:
   determining, by the terminal device, a first resource pool corresponding to the first transmission mode according to the first transmission mode and a first corresponding relationship, wherein the first corresponding relationship is a corresponding relationship between a plurality of transmission modes and a plurality of resource pools, and a resource pool corresponding to each transmission mode is different; and
   transmitting the first data to the network device in the first resource pool by adopting the first transmission mode.

5. The method of claim 1, wherein, the transmission modes adopted by the terminal device for transmitting a plurality of times are preconfigured by the network device for the terminal device, or predetermined by the terminal device and the network device, or determined by the terminal device.

6. The method of claim 1, wherein, receiving, by the terminal device, the first indication information transmitted by the network device, comprises:
   receiving, by the terminal device, downlink control information (DCI) transmitted by the network device for scheduling the second data, wherein the DCI comprises the first indication information.

7. The method of claim 1, wherein, determining, by the terminal device, the transmission parameter of the second data according to the first indication information, comprises:
   determining, by the terminal device, a transmission parameter used for the one transmission indicated by the first indication information as the transmission parameter of the second data.

8. The method of claim 1, wherein the transmission parameter comprises at least one of:
   a time domain resource, a frequency domain resource, a code domain resource, a DMRS sequence, a MIMO transmission mode, an antenna port, a precoding matrix, an antenna array block, a beam, and a transmission power.

9. The method of claim 1, wherein the first indication information is specifically used for indicating an index of the one transmission in the at least one transmission or a resource or resource index used for the one transmission.

10. A terminal device, comprising: a memory, a processor, an input interface, and an output interface, wherein the memory is used for storing instructions, and the processor is used for executing the instructions stored in the memory when the processor executes the instructions stored in the memory, the execution causes the processor to control the output interface to transmit:
   first data to a network device at least once and control the input interface to receive first indication information transmitted by the network device, wherein the first indication information is used for indicating one transmission in the at least one transmission of the first data; and
   when the processor executes the instructions stored in the memory, the execution causes the processor to determine a transmission parameter of second data according to the first indication information;
   wherein when the processor executes the instructions stored in the memory, the execution causes the processor to control the output interface further to transmit the second data to the network device by adopting the transmission parameter of the second data; wherein when the processor executes the instructions stored in the memory, the execution causes the processor to control the output interface further to transmit the first data to the network device a plurality of times by adopting different transmission modes.

11. The terminal device of claim 10, wherein the first data is data transmitted by the terminal device autonomously.

12. The terminal device of claim 10, wherein when the processor executes the instructions stored in the memory, the execution causes the processor to control the output interface to transmit the first data to the network device a plurality of times by adopting different Multiple-input Multiple-output (MIMO) transmission modes;
   or,
   transmit the first data to the network device a plurality of times by adopting different antenna ports;
   or,
   transmit the first data to the network device a plurality of times by adopting different precoding matrices;
   or,
   transmit the first data to the network device a plurality of times by adopting different antenna array blocks;
   or,
   transmit the first data to the network device a plurality of times by adopting different beams;
   or,
   transmit the first data to the network device a plurality of times by adopting different transmission powers;
   or,
   transmit the first data to the network device a plurality of times by adopting different demodulation reference signal (DMRS) sequences.

13. The terminal device of claim 10, wherein the different transmission modes comprise a first transmission mode, and when the processor executes the instructions stored in the memory, the execution causes the processor further to determine a first resource pool corresponding to the first transmission mode according to the first transmission mode and a first corresponding relationship, wherein the first corresponding relationship is a corresponding relationship between a plurality of transmission modes and a plurality of resource pools, and a resource pool corresponding to each transmission mode is different; and
   when the processor executes the instructions stored in the memory, the execution causes the processor to control the output interface further to transmit the first data to the network device by adopting the first transmission mode in the first resource pool.

14. The terminal device of claim 10, wherein, the transmission modes adopted by the terminal device for transmitting a plurality of times are preconfigured by the network device for the terminal device, or predetermined by the terminal device and the network device, or determined by the terminal device.

15. The terminal device of claim 10, wherein when the processor executes the instructions stored in the memory, the execution causes the processor to control the input interface to receive downlink control information (DCI) transmitted by the network device for scheduling the second data, wherein the DCI comprises the first indication information.

16. The terminal device of claim 10, wherein when the processor executes the instructions stored in the memory, the execution causes the processor to determine a transmission parameter used for the one transmission indicated by the first indication information as the transmission parameter of the second data.

17. The terminal device of claim 10, wherein the transmission parameter comprises at least one of:
a time domain resource, a frequency domain resource, a code domain resource, a DMRS sequence, a MIMO transmission mode, an antenna port, a precoding matrix, an antenna array block, a beam, and a transmission power.

18. The terminal device of claim 10, wherein the first indication information is specifically used for indicating an index of the one transmission in the at least one transmission or a resource or resource index used for the one transmission.

* * * * *